(12) United States Patent
Liu

(10) Patent No.: US 11,337,259 B2
(45) Date of Patent: May 17, 2022

(54) METHOD FOR AUTOMATIC CONNECTION BETWEEN SMART DEVICE AND ROUTER, CORRESPONDING ROUTER AND SMART DEVICE

(71) Applicant: SHENZHEN HEQIANG ELECTRONICS LIMITED, Shenzhen (CN)

(72) Inventor: Dan Liu, Shenzhen (CN)

(73) Assignee: SHENZHEN HEQIANG ELECTRONICS LIMITED, Shenzhen (CN)

( * ) Notice: Subject to any disclaimer, the term of this patent is extended or adjusted under 35 U.S.C. 154(b) by 195 days.

(21) Appl. No.: 16/556,278

(22) Filed: Aug. 30, 2019

(65) Prior Publication Data

US 2021/0029751 A1    Jan. 28, 2021

Related U.S. Application Data

(63) Continuation of application No. PCT/CN2019/100345, filed on Aug. 13, 2019.

(30) Foreign Application Priority Data

Jul. 23, 2019    (CN) .......................... 201910667919.9

(51) Int. Cl.
*H04W 76/10* (2018.01)
*H04W 8/22* (2009.01)
(Continued)

(52) U.S. Cl.
CPC ............. *H04W 76/10* (2018.02); *H04W 8/22* (2013.01); *H04W 48/16* (2013.01); *H04W 88/16* (2013.01)

(58) Field of Classification Search
CPC ....... H04W 76/10; H04W 8/22; H04W 48/16; H04W 88/16
See application file for complete search history.

(56) References Cited

U.S. PATENT DOCUMENTS 10,419,908 B1 *   9/2019   Hutz .................... H04W 76/10
2012/0284785 A1 * 11/2012   Salkintzis ........... H04W 12/068
726/7

(Continued)

FOREIGN PATENT DOCUMENTS

CN    102164399    8/2011
CN    104301891    1/2015

(Continued)

OTHER PUBLICATIONS

International Search Report issued in corresponding International application No. PCT/CN2019/100345, dated Dec. 31, 2019(4 pages).

(Continued)

*Primary Examiner* — Luat Phung
(74) *Attorney, Agent, or Firm* — Leason Ellis LLP

(57) ABSTRACT

Disclosed are a method for automatic connection between a smart device and a router, a corresponding router and smart device, which belong to the technical field of wireless communications. The method for automatic connection between a smart device and a router include the following. The router receives a trigger instruction triggered by a key arranged on the router. In response to the trigger instruction, a hidden wireless communication function of the router is enabled. If it is detected within a preset period of time that the smart device connects to a communication link corresponding to the hidden wireless communication function, network connection information is transmitted to the smart device to trigger connection of the smart device to a network connected to the router. By improving the method for (Continued)

connecting between a smart device and a router, it is possible to achieve automatic connection between the smart device and the router.

14 Claims, 4 Drawing Sheets

(51) Int. Cl.
*H04W 48/16* (2009.01)
*H04W 88/16* (2009.01)

(56) References Cited

U.S. PATENT DOCUMENTS

| | | | |
|---|---|---|---|
| 2015/0081859 A1 | 3/2015 | Xu et al. | |
| 2015/0139025 A1* | 5/2015 | Lee | H04W 12/50 |
| | | | 370/254 |
| 2020/0008056 A1* | 1/2020 | Wu | H04W 52/36 |
| 2021/0136545 A1* | 5/2021 | Hutz | H04W 4/50 |

FOREIGN PATENT DOCUMENTS

| | | | |
|---|---|---|---|
| CN | 107135529 | | 9/2017 |
| CN | 108184237 | | 6/2018 |
| CN | 109462850 | | 3/2019 |
| CN | 109768946 | * | 5/2019 |

OTHER PUBLICATIONS

International Searching Authority for No. PCT/CN2019/100345, dated Dec. 31, 2019(4 pages).

* cited by examiner

METHOD FOR AUTOMATIC CONNECTION BETWEEN SMART DEVICE AND ROUTER, CORRESPONDING ROUTER AND SMART DEVICE

The present application claims priority to Chinese Patent Application 201910667919.9, filed with Chinese Patent Office on Jul. 23, 2019, entitled "METHOD FOR AUTOMATIC CONNECTION BETWEEN SMART DEVICE AND ROUTER, CORRESPONDING ROUTER AND SMART DEVICE", the contents of which are hereby incorporated by reference in its entirety.

TECHNICAL FIELD

The disclosure relates to the technical field of wireless communications, and more particularly to a method for automatic connection between a smart device and a router, a corresponding router and smart device.

BACKGROUND

With the development and popularization of the Internet and wideband home networks, routers have become necessities of wireless networks. An increasing number of smart devices need to connect to a network via routers to perform information exchange and communication.

In prior art, a common manner for connecting to a network is as follows. After turning on a router, a user manually controls a smart device to detect a SSID (Service Set Identifier) of the router, and performs network setting through a network setting interface of the smart device. During network connecting, such a manner not only consumes a relatively long time, but also involves complicated and cumbersome procedures so that it is difficult for most of ordinary users to independently and quickly complete the network setting.

SUMMARY

The disclosure is intended to provide a method for automatic connection between a smart device and a router, a corresponding router and smart device, which can achieve automatic connection between the smart device and the router.

To this end, according to a first aspect of the disclosure, there is provided a method for automatic connection between a smart device and a router, applied to the router, the method including:

Receiving a trigger instruction triggered by a key arranged on the router;

In response to the trigger instruction, enabling a hidden wireless communication function of the router, wherein the hidden wireless communication function is associated with a first hidden SSID; and if it is detected within a preset period of time that the smart device connects to a communication link corresponding to the hidden wireless communication function, transmitting network connection information to the smart device to trigger connection of the smart device to a network connected to the router based on the network connection information, wherein the network connection information comprises a second SSID and a password of the router.

Based on the first aspect, in a first exemplary implementation, before the step of transmitting network connection information to the smart device, the method may further include:

Receiving gateway discovery information transmitted by the smart device;

In response to the gateway discovery information, transmitting gateway discovery response information to the smart device; and Receiving and responding to network connection request information transmitted by the smart device.

Based on the first aspect or the first exemplary implementation of the first aspect, in a second exemplary implementation, after the step of transmitting network connection information to the smart device, the method may further include:

When the network connection information of the router changes, transmitting updated network connection information to the smart device.

Based on the first aspect or the first exemplary implementation of the first aspect, in a third exemplary implementation, after the step of enabling a hidden wireless communication function of the router, the method may further include: disabling the hidden wireless communication function of the router after a preset period of time elapses.

According to a second aspect of the disclosure, there is provided a method for automatic connection between a smart device and a router, applied to the smart device, the method including:

Receiving a trigger instruction triggered by a key arranged on the smart device;

In response to the trigger instruction, performing communication connection based on a preset first SSID and a preset password; and If the smart device successfully connects to a communication link corresponding to the preset first SSID within a preset period of time and receives network connection information transmitted by the router, connecting to a network connected to the router based on the network connection information, wherein the network connection information comprises a second SSID and a password of the router.

Based on the second aspect of the disclosure, in a first exemplary implementation, after the smart device successfully connects to a communication link corresponding to the preset first SSID, the method may further include:

Transmitting gateway discovery information to the router;

Receiving gateway discovery response information transmitted by the router; and

Transmitting network connection request information according to the received gateway discovery response information to trigger transmission of the network connection information by the router.

Based on the second aspect of the disclosure or the first exemplary implementation of the second aspect of the disclosure, in a second exemplary implementation, after the step of connecting to a network connected to the router based on the network connection information, the method may further include:

Upon reception of new network connection information transmitted by the router, connecting to the network connected to the router based on the new network connection information.

Based on the second aspect of the disclosure or the first exemplary implementation of the second aspect of the disclosure, in a third exemplary implementation, the method may further include: if the smart device fails to successfully connect to a communication link corresponding to the preset first SSID within a preset period of time, outputting prompt information.

According to a third aspect of the disclosure, there is provided a router including: a memory storing computer programs, and a processor, wherein when the computer programs are executed by the processor, the processor is caused to perform steps of any method applied to the router.

According to a fourth aspect of the disclosure, there is provided a smart device including: a memory storing computer programs, and a processor, wherein when the computer programs are executed by the processor, the processor is instructed to perform steps of any method applied to the smart device.

As can be seen from above, the router according to the disclosure is provided with the first SSID and the second SSID. Firstly, after the router enables a communication function (the aforementioned hidden wireless communication function) associated with the first SSID, the smart device can be triggered to connect to a communication link corresponding to the communication function. Secondly, the setting of the present period of time can reduce the possibility of mis-connection of other smart devices to the router, thereby achieving the purpose of improving security.

BRIEF DESCRIPTION OF THE DRAWINGS

In order to more clearly describe the technical solutions of the embodiments of the disclosure, the accompanying drawings required to be used in description of the embodiments or the prior art are briefly described. It is apparent that the drawings are only those described according to some embodiments of the disclosure, and those skilled in the art can obtain, without creative efforts, other drawings from the drawings described below.

DETAILED DESCRIPTION OF SPECIFIC EMBODIMENTS

For purposes of illustration and not limitation, specific details such as particular system structures and techniques are provided in the following description to provide a thorough understanding of the embodiments of the disclosure. However, it is understood that embodiments of the disclosure may be practiced without these specific details. Additionally, description of well-known systems, devices, circuits and methods will be omitted so as not to obscure the description of the present disclosure with unnecessary detail.

It is to be understood that the term "including/comprising", used in the description and the accompanying claims, needs to be interpreted as specifying the presence of the stated features, integers, steps, operations, elements and/or components as referred to, but does not preclude the presence or addition of one or more other features, integers, steps, operations, elements, components and/or groups thereof.

It is to be further understood that the terms used in the present application are merely used to describe particular embodiments, and are not intended to limit the present invention. As used in the specification and the accompanying claims, the expression "a", "an" and "the" in the singular form will cover the expression in the plural form unless otherwise indicated obviously from the context.

The technical solutions in the embodiments of the disclosure will be described below clearly and completely with reference to the accompanying drawings. However, it should be clarified that, embodiments described are only a part of embodiments of the present invention, and are not all of embodiments thereof. All other embodiments obtained by persons of ordinary skill in the art based on the embodiments of the present invention without creative efforts shall fall within the protection scope of the present invention.

Various details are set forth in the following description to facilitate a full understanding of the invention, but the invention may be practiced in any other manner than specifically described above, and it is understood by those skilled in the art that various modifications and changes can be made without departing from the spirit and scope of the invention.

First Embodiment

Figure 1:
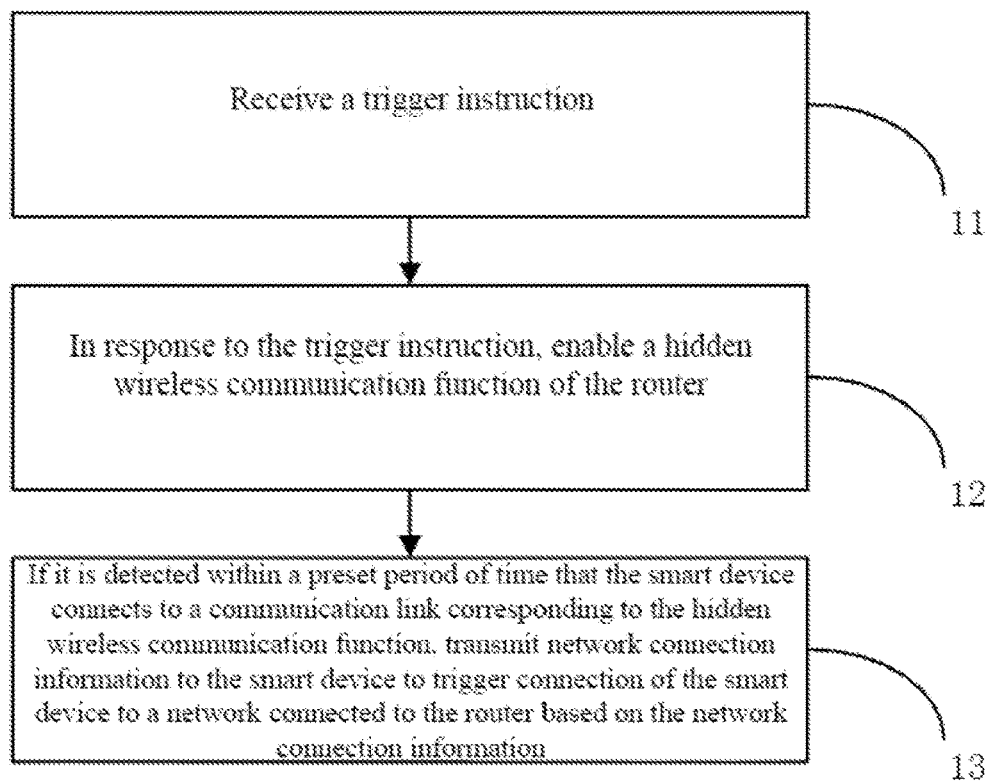
FIG. 1 is a schematic flow chart of a method for automatic connection between a smart device and a router according to an embodiment of the disclosure.

The embodiment of the disclosure provides a method for automatic connection between a smart device and a router, which is applied to the router. As shown in FIG. 1, the method includes the following steps.

In step 11, a trigger instruction is received.

In the embodiment of the disclosure, the router may be arranged with a physical key, and a user may input the trigger instruction by triggering the physical key (for example, a single click on the physical key). Alternatively, the router may be arranged with a virtual key, and the user may input the trigger instruction by triggering the virtual key (for example, a single click on the virtual key). Alternatively, the user may also input the trigger instruction through an interface of an application (APP) associated with the router, which is not limited herein.

In step 12, in response to the trigger instruction, a hidden wireless communication function of the router is enabled.

Herein, the hidden wireless communication function is associated with a first hidden SSID.

Specifically, upon reception of the trigger instruction, the router enables the first hidden SSID, and it can further detect whether there is a smart device connecting to a communication link corresponding to the first SSID within a preset period of time. Optionally, the first SSID is set in advance with a 32-bit password, and encrypted through WPA2/AES to ensure security.

Further, after the hidden wireless communication function of the router is enabled, the method further includes: disabling the hidden wireless communication function of the router after the preset period of time elapses.

Specifically, the preset period of time is a period of time set in advance, within which the first SSID of the router is enabled. According to an embodiment, the preset period of time can be set to 2 minutes, and after the 2 minutes elapse, the router disables the first SSID to terminate the network connecting process.

In step 13, if it is detected within a preset period of time that the smart device connects to a communication link corresponding to the hidden wireless communication function, network connection information is transmitted to the smart device to trigger connection of the smart device to a network connected to the router based on the network connection information.

Herein, the network connection information includes a second SSID and a password of the router.

In the embodiment of the disclosure, after the router enables the hidden wireless communication function, if it is detected within the preset period of time that there is a smart device connecting to the communication link based on the first SSID and the corresponding password, the router allows the smart device to connect to a communication link so as to establish a preliminary connection with the smart device, and transmits its second SSID and a corresponding password to the smart device so that the smart device connects to the network connected to the router based on the second SSID and the corresponding password, thereby enabling the Internet surfing function of the smart device. Further, the router may also disable the first SSID after the network is successfully connected to prevent mis-connection of other smart devices to the network, thereby improving security.

Herein, the preliminary connection is only used for data transmission between the router and the smart device to be connected, and does not have rights such as network access and communication.

Further, before the network connection information is transmitted to the smart device, the method further includes: receiving the gateway discovery information transmitted by the smart device; in response to the gateway discovery information, transmitting the gateway discovery response information to the smart device; and receiving and responding to the network connection request information transmitted by the smart device. After the network connection request information transmitted by the smart device is responded to (for example, transmitting network connection request response information to the smart device), the network connection information can be transmitted to the smart device.

Specifically, the gateway discovery response information may include an Internet Protocol (IP) address of a gateway of the router, which is subsequently used by the smart device to interact with the gateway to perform data transmission with the router.

Specifically, the network connection request information may include a Media Access Control (MAC) address and a device type of the smart device.

Further, the router may add the smart device into a device list according to the MAC address and the device type of the smart device, to facilitate next connection.

Further, after the network connection information is transmitted to the smart device, the method further includes: when the network connection information of the router changes, transmitting the updated network connection information to the smart device, where the updated network connection information includes an updated second SSID and a corresponding password.

Further, after the network connection information is transmitted to the smart device, the method further includes: receiving and responding to the network connection state information transmitted by the smart device, where the network connection state information can indicate a network connection state of the smart device; receiving and responding to the request information for going online used for requesting access to a network and transmitted by the smart device, where the request information for going online includes the MAC address and the device type of the smart device.

Specifically, the next time when the router establishes connection with the smart device, the router may directly receive the request information for going online transmitted by the smart device, and determine, based on the request information for going online, whether the smart device is in the device list. If the information (for example, MAC address) related to the smart device already exists in the device list, the request information for going online is responded to so that the smart device can directly have access to the network, thereby achieving fast and automatic connection between the router and the smart device.

Further, after the request information for going online transmitted by the smart device is responded to, the method further includes: receiving and responding to heartbeat information transmitted by the smart device to determine whether the smart device remains in a network connected state. Optionally, the heartbeat information is received and responded to once every 10 seconds.

As can be seen from above, in the embodiment of the disclosure, when receiving the trigger instruction, the router enables its hidden wireless communication function to wait for connection of the smart device, transmits the second SSID and the password to the smart device establishing a preliminary connection within the preset period of time so that the smart device can, based on the second SSID and the password, connect to the network connected to the router, thereby achieving the purpose of fast completing automatic connection with the smart device within the preset period of time.

Second Embodiment

Figure 2:
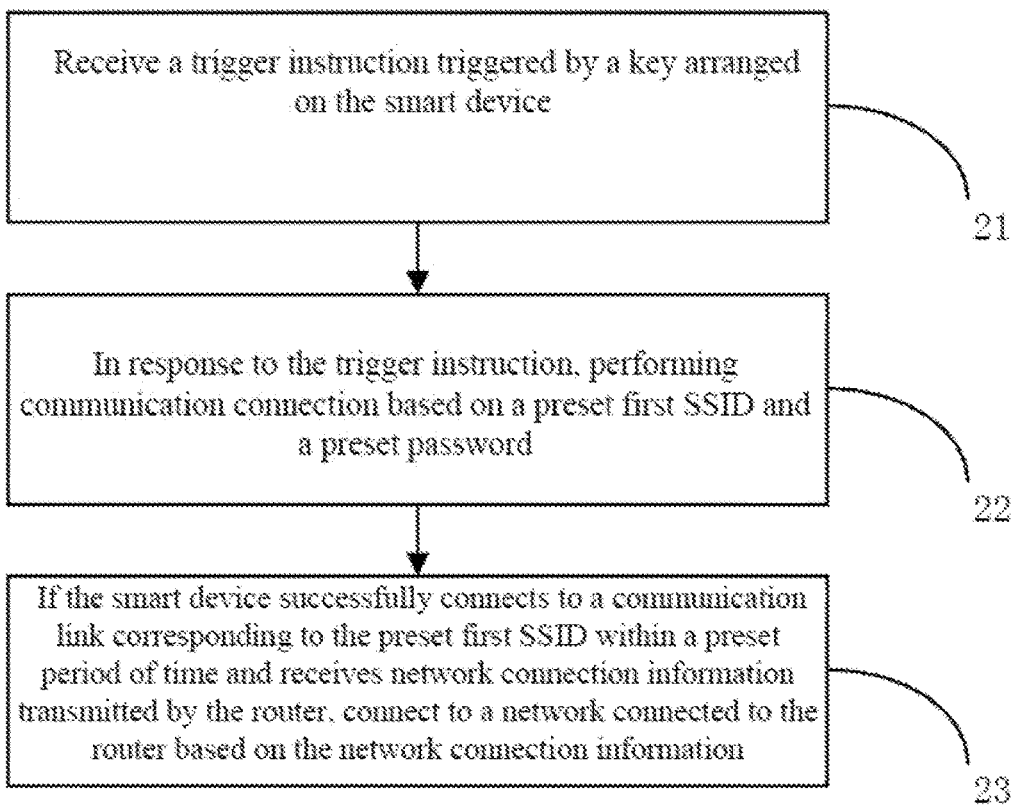
FIG. 2 is a schematic flow chart of a method for automatic connection between a smart device and a router according to another embodiment of the disclosure.

The embodiment of the disclosure provides a method for automatic connection between a smart device and a router, which is applied to the smart device. As shown in FIG. 2, the method includes the following steps.

In step 21, a trigger instruction is received.

In the embodiment of the disclosure, the smart device may be arranged with a physical key, and a user may input the trigger instruction by triggering the physical key (for example, a single click on the physical key). Alternatively, the smart device may be arranged with a virtual key, and the user may input the trigger instruction by triggering the virtual key (for example, a single click on the virtual key). Alternatively, the user may also input the trigger instruction through an interface of an application (APP) associated with the smart device, which is not limited herein.

Herein, the smart device may be a smart device that has a network connection function and needs to establish a connection with the router to perform network communication through the router, such as a smart remote controller and a luminaire, which is not limited herein.

In step 22, in response to the trigger instruction, communication connection is performed based on a preset first SSID and a preset password.

Specifically, when the trigger instruction is received, the smart device connects to a communication link corresponding to the first SSID based on the first SSID set in advance and the corresponding password. Optionally, the password set in advance is a 32-bit password, and encrypted through WPA2/AES to ensure security.

Further, if the smart device fails to successfully connect to a communication link corresponding to the preset first SSID within a preset period of time, prompt information is output.

In the embodiment of the disclosure, the prompt information may be used to indicate a connection state (for example, prompting the user that the smart device is not connected to the router). The prompt information may also be used to prompt the user to perform a next operation (for example, inputting the trigger instruction once again on the router and the smart device for performing network connection), which is not limited herein.

The prompt information may be represented through a change of the indicator (for example, blinking of the indicator) or through a change in sound (for example, producing a buzzing sound), which is not limited herein.

Specifically, the preset period of time is a period of time set in advance, after which the prompt information is output. According to an embodiment, the preset period of time can be set to 2 minutes, and after the 2 minutes elapse, the smart device outputs the prompt information to represent a connection state or prompt the user to perform a next operation.

In step 23, if the smart device successfully connects to a communication link corresponding to the first SSID within a preset period of time and receives the network connection information transmitted by the router, the smart device connects to a network connected to the router based on the network connection information.

In the embodiment of the disclosure, after the smart device connects to the communication link based on the first SSID set in advance and the corresponding password within the preset period of time, the router transmits network connection information to the smart device. Upon reception of the network connection information transmitted by the router, the smart device establishes a network connection with the router based on a second SSID and a corresponding password. Herein, the network connection information includes the second SSID and the corresponding password of the router.

Herein, the preliminary connection is only used for data transmission with the router, and does not have rights such as network access and communication.

Further, after the smart device successfully connects to the communication link corresponding to the first SSID, the method further includes: transmitting the gateway discovery information to the router; receiving the gateway discovery response information transmitted by the router; transmitting the network connection request information to the router according to the received gateway discovery response information to trigger transmission of the network connection information by the router.

Specifically, to perform data transmission with the router, the gateway discovery information may be transmitted to the router after the preliminary connection is established, and the gateway discovery response information transmitted by the router may be received. The gateway discovery response information may include a gateway IP address of the router, based on which data transmission with the router can be performed.

Specifically, the smart device transmits the network connection request information to the router based on the gateway IP address of the router, where the network connection request information may include an MAC address and a device type of the smart device.

Further, when receiving the gateway IP address of the router and the network connection information, the smart device may add the router into a device list, to facilitate next connection.

Further, after the smart device connects to the network connected to the router based on the network connection information, the method further includes: upon reception of new network connection information transmitted by the router, connecting the network connected to the router based on the new network connection information. Herein, the new network connection information includes a new second SSID and a corresponding password of the router.

Further, after the network connection information transmitted by the router is received, the method further includes: transmitting the network connection state information to the router, where the network connection state information can indicate a network connection state of the smart device; receiving the response information transmitted by the router; when the smart device needs to have access to the network, transmitting the request information for going online to the router, where the request information for going online includes an MAC address and a device type of the smart device.

Specifically, the next time when the smart device establishes connection with the router, if the gateway IP address and the network connection information of the router previously connected is already stored in the device list, the smart device may directly transmit the request information for going online to the router. If the response information transmitted by the router is received, the smart device can directly have access to the network, thereby achieving fast and automatic connection with the router.

Further, after the response information transmitted by the router according to the network connection information is received, the method further includes: transmitting the heartbeat information to the router, and receiving the heartbeat response information from the router, to determine whether the smart device remains in a network connected state. Optionally, the heartbeat information is received and responded to once every 10 seconds.

As can be seen from above, in the embodiment of the disclosure, after receiving and responding to the trigger instruction, the smart device performs communication connection with the router according to the first SSID and the password that are set in advance, thus the user does not need to perform manual search. If the smart device successfully connects to a communication link corresponding to the first SSID within a preset period of time and receives the network connection information transmitted by the router, the smart device connects to a network connected to the router based on the network connection information. Thus, it is possible to achieve the purpose of fast completing automatic connection with the router within the preset period of time.

Based on the method shown in FIG. 1 and FIG. 2, in an embodiment, a user may firstly trigger a corresponding key on the router to input the trigger instruction so as to enable the hidden wireless communication function of the router, then trigger, within the preset period of time, a corresponding key on the smart device to trigger connection of the smart device to the communication link corresponding to the hidden wireless communication function so that the network connection information is acquired from the router to perform automatic connection to the network. In another embodiment, the user may also firstly trigger the corresponding key on the smart device to trigger the smart device's connection to the router based on the preset first SSID and the password, then the user may trigger, with a preset period of time, the corresponding key on the router to enable the hidden wireless communication function of the router, so that within the preset period of time, the smart device connects to the router based on the preset first SSID and the password and acquires from the router the network connection information to perform automatic connection to the network.

Third Embodiment

Figure 3:
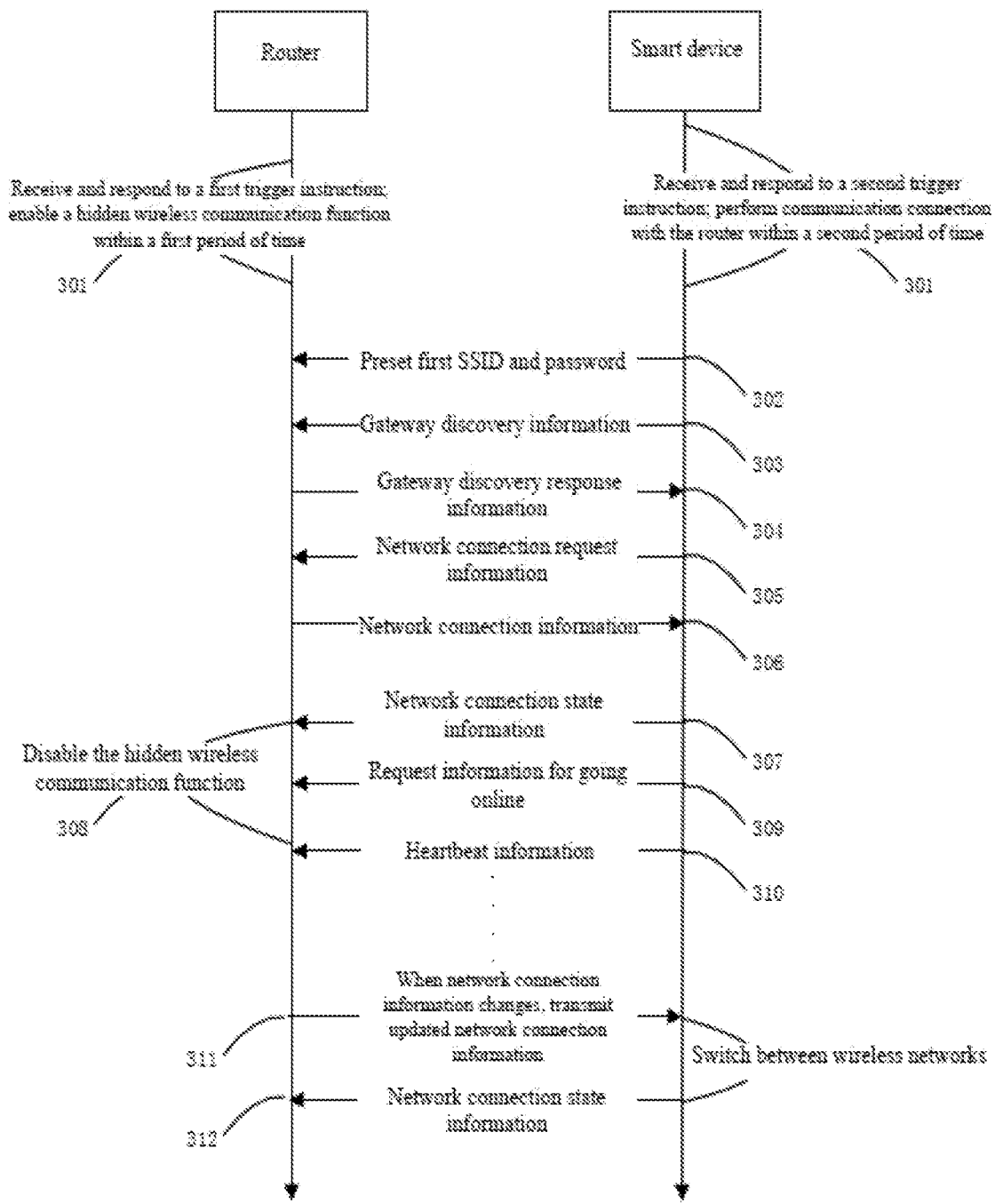
FIG. 3 is a schematic diagram illustrating interaction of a method for automatic connection between a smart device and a router according to another embodiment of the disclosure.

Hereinafter a specific application scenario is taken as an example to describe the interaction of a method for automatic connection between a smart device and a router according to an embodiment of the disclosure. As shown in FIG. 3, the method includes the following steps.

In step 301, a router receives and responds to a first trigger instruction, and enables a hidden wireless communication function of the router; a smart device receives and responds to a second trigger instruction, and performs communication connection with the router within a second period of time.

Specifically, the hidden wireless communication function is associated with a first hidden SSID.

Optionally, the first or second period of time can be set to 2 minutes. After the first period of time elapses, the router disables the hidden wireless communication function to reduce the possibility of mis-connection of other smart devices to the router, thereby achieving the purpose of improving security. If the smart device fails to successfully establish the communication connection with the router within the second period of time, prompt information can be output, based on which the user can perform a next operation.

It is to be noted that the terms "first" and "second" in the first trigger instruction and the second trigger instruction are only used to distinguish trigger instructions input on different subjects (for example, the router or the smart device). The terms "first" and "second" in the first period of time and the second period of time are only used to distinguish periods of time preset on different subjects (for example, the router or the smart device). Specifically, the first trigger instruction refers to a trigger instruction input on the router; the second trigger instruction refers to a trigger instruction input on the smart device; the first period of time refers to a period of time preset on the router; and the second period of time refers to a period of time preset on the smart device. Herein, the first period of time and the second period of time can be the same, or can also be different, which is not limited herein.

In step 302, the smart device connects to a communication link corresponding to a preset first SSID of the router based on the first SSID and a password within a preset period of time.

Specifically, with a preliminary connection established by connecting to the communication link corresponding to the first SSID of the router, the smart device does not have rights to have access to a network connected to the router, but only has rights to perform data transmission with the router.

Optionally, the smart device communicates with the router using the User Datagram Protocol (UDP) when performing data transmission therebetween.

Optionally, the smart device and the router listen for a default port of 8686 when performing data transmission therebetween.

In step 303, after the smart device successfully connects to the communication link, the smart device transmits gateway discovery information to the router.

In step 304, after receiving the gateway discovery information, the router returns gateway discovery response information to the smart device.

Specifically, the smart device may perform subsequent data transmission and interaction with the router through a gateway IP address contained in the gateway discovery response information.

In step 305, the smart device transmits network connection request information to the router.

Specifically, the network connection request information may include the MAC address and the device type of the smart device. After receiving the network connection request information, the router responds to the network connection request information, and adds the network connection request information into the device list, to facilitate fast establishment of network connection by the smart device next time.

In step 306, upon reception of the network connection request information, the router transmits the network connection information to the smart device.

Herein, the network connection information includes the second SSID and the password of the router. The smart device can connect to the second SSID of the router through the received network connection information to establish the network connection, thereby acquiring the rights of having access to the network connected to the router.

In step 307, the smart device connects to the network connected to the router based on the network connection information, and transmits network connection state information to the router.

Specifically, after connecting to the second SSID of the router through the network connection information, the smart device transmits, to the router, the network connection state information including a network connection state. If the connection succeeds, the network connection state is network connection success. When it is required to have access to the network, the smart device transmits a request for going online to the router. If the connection fails, the network connection state is network connection failure, and the smart device continues to establish the connection.

In step 308, the router disables the hidden wireless communication function.

Optionally, when the router receives the network connection state information transmitted by the smart device, the router disables the hidden wireless communication function to reduce the possibility of mis-connection of other smart devices to the router, thereby achieving the purpose of improving security.

In step 309, the smart device transmits the request information for going online to the router.

Optionally, when the smart device needs to have access to the network, the smart device transmits the request information for going online to have access to the network through the router.

Optionally, the next time when the smart device connects to the router, if a gateway IP address and the network connection information of the router exist in the device list, there is no need to establish the preliminary connection, and the smart device only needs to directly transmit the request information for going online to the router.

In step 310, the smart device transmits the heartbeat information to the router.

Optionally, the heartbeat information may be transmitted once every 10 seconds to determine whether the smart device always remains in the connected state.

In step 311, when the network connection information of the network connected to the router changes, the router transmits updated network connection information to the smart device.

In step 312, the smart device connects to the network connected to the router based on the received new network connection information, and transmits network connection state information to the router.

In the embodiment of the disclosure, if the user updates the second SSID and/or the corresponding password of the router, the router transmits the updated network connection information to the smart device connected to the router; and the smart device connects to the new SSID of the router again through the received new network connection information. Further, the smart device may also transmit the network connection state information to the router. If the network connection state is network connection success and the router returns response information, the smart device can transmit a request for going online to the router to have access to the network connected to the router.

Optionally, when the smart device does not need to have access to the network through the router, the smart device can transmit request information for going offline to the router. After the router receives and responds to the request information for going offline, the network connection process between the smart device and the router is completed.

As can be seen from above, the router according to the disclosure is provided with the first SSID and the second SSID. Firstly, after the router enables a communication function (the aforementioned hidden wireless communication function) associated with the first SSID, the smart device can be triggered to connect to a communication link corresponding to the hidden wireless communication function. Secondly, the setting of the present period of time can reduce the possibility of mis-connection of other smart devices to the router, thereby achieving the purpose of improving security.

Fourth Embodiment

Figure 4:
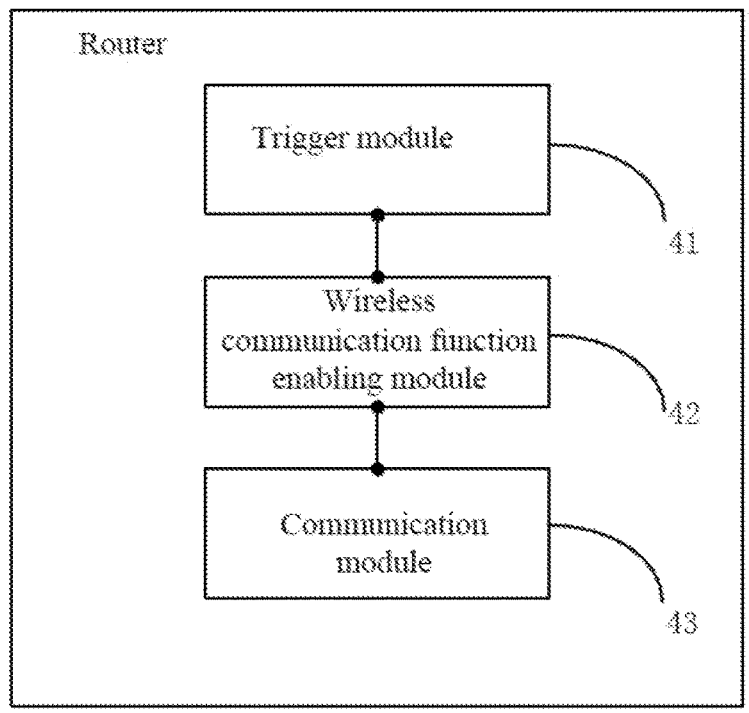
FIG. 4 is a schematic structural diagram of a router according to another embodiment of the disclosure.

Embodiments of the disclosure further provide a router corresponding to the method for automatic connection between the smart device and the router, which is applied to the router. FIG. 4 shows a schematic structural diagram of a router according to the embodiment of the disclosure. Only parts related to the embodiment are shown for ease of illustration. Various components that are not specifically illustrated in the embodiment correspond to the method for automatic connection between the smart device and the router according to the first embodiment, unless otherwise specifically indicated.

Specifically, as shown in FIG. 4, the router includes a trigger module 41, a wireless communication function enabling module 42 and a communication module 43.

The trigger module 41 is configured to receive a trigger instruction triggered by a key arranged on the router.

The wireless communication function enabling module 42 is configured to enable a hidden wireless communication function of the router in response to the trigger instruction, where the hidden wireless communication function is associated with a first hidden SSID.

The communication module 43 is configured to transmit network connection information to the smart device to trigger connection of the smart device to a network connected to the router based on the network connection information, when it is detected within a preset period of time that the smart device connects to a communication link corresponding to the hidden wireless communication function, where the network connection information comprises a second SSID and a password of the router.

Specifically, the communication module 43 is further configured to: (i) receive gateway discovery information transmitted by the smart device before transmitting the network connection information to the smart device; (ii) transmit gateway discovery response information to the smart device in response to the gateway discovery information; and (iii) receive and respond to network connection request information transmitted by the smart device.

Optionally, the communication module 43 is further configured to transmit updated network connection information to the smart device after transmitting the network connection information to the smart device, when the network connection information of the router changes.

Optionally, the router further includes a wireless communication function disabling module (not shown in the figure) configured to disable the wireless communication function of the router after the hidden wireless communication function of the router is enabled for a preset period of time; or to disable the hidden wireless communication function of the router after the smart device successfully establishes a network connection with the router.

Optionally, the router further includes an information maintenance module (not shown in the figure) configured to maintain information related to the smart device in a device list of the router, such as an MAC address, a device type or the like of the smart device.

As can be seen from above, in the embodiment of the disclosure, when receiving the trigger instruction, the router enables its hidden wireless communication function to wait for connection of the smart device, transmits the second SSID and the password to the smart device establishing a preliminary connection within the preset period of time so that the smart device can, based on the second SSID and the password, connect to the network connected to the router, thereby achieving the purpose of fast completing automatic connection with the smart device within the preset period of time.

Fifth Embodiment

Figure 5:
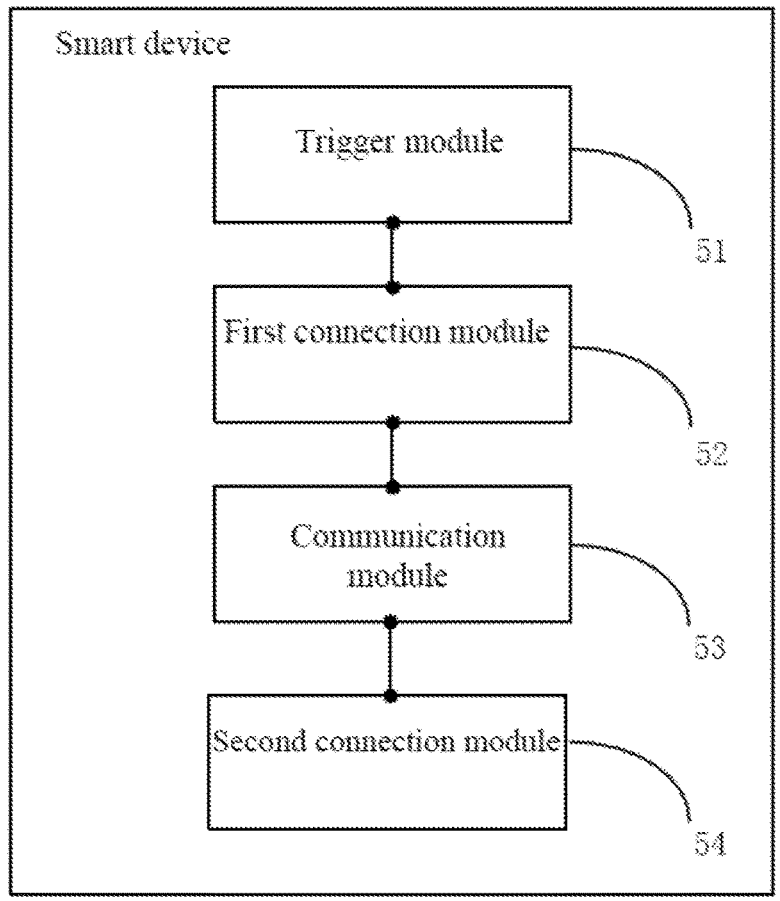
FIG. 5 is a schematic structural diagram of a smart device according to another embodiment of the disclosure.

Embodiments of the disclosure further provide a smart device corresponding to the method for automatic connection between the smart device and the router, which is applied to the smart device. FIG. 5 shows a schematic structural diagram of a smart device according to the embodiment of the disclosure. Only parts related to the embodiment are shown for ease of illustration. Various components that are not specifically illustrated in the embodiment correspond to the method for automatic connection between the smart device and the router according to the second embodiment, unless otherwise specifically indicated.

Specifically, as shown in FIG. 5, the smart device includes a trigger module 51, a first connection module 52, a communication module 53 and a second connection module 54.

The trigger module 51 is configured to receive a trigger instruction triggered by a key arranged on the smart device.

The first connection module 52 is configured to perform communication connection based on a preset first SSID and a preset password in response to the trigger instruction.

The communication module 53 is configured to connect to a network connected to the router based on the network connection information through the second connection module 54, when the smart device successfully connects to a communication link corresponding to the first SSID within a preset period of time and receives network connection information transmitted by the router.

Specifically, the communication module 53 is further configured to: (i) transmit gateway discovery information to the router after the smart device successfully connects to the communication link corresponding to the first SSID; (ii) receive gateway discovery response information transmitted by the router; and (iii) transmit network connection request information to the router according to the received gateway discovery response information.

Optionally, the communication module 53 is further configured to connect to the network connected to the router based on the new network connection information after receiving the network connection information transmitted by the router, when new network connection information transmitted by the router is received.

Optionally, the smart device further includes an information prompting module (not shown in the figure) configured to output prompt information when the first connection module 52 fails to successfully connect to a communication link corresponding to the preset first SSID within a preset period of time.

Optionally, the smart device further includes an information maintenance module (not shown in the figure) configured to maintain information related to the router in a device list of the smart device, such as a gateway IP address, the network connection information.

As can be seen from above, in the embodiment of the disclosure, after receiving and responding to the trigger instruction, the smart device performs communication connection with the router according to the first SSID and the password that are set in advance, thus the user does not need to perform manual search. If the smart device successfully connects to a communication link corresponding to the first SSID within a preset period of time and receives network connection information transmitted by the router, the smart device connects to a network connected to the router based on the network connection information. Thus, it is possible to achieve the purpose of fast completing automatic connection with the router within the preset period of time.

Sixth Embodiment

Figure 6:
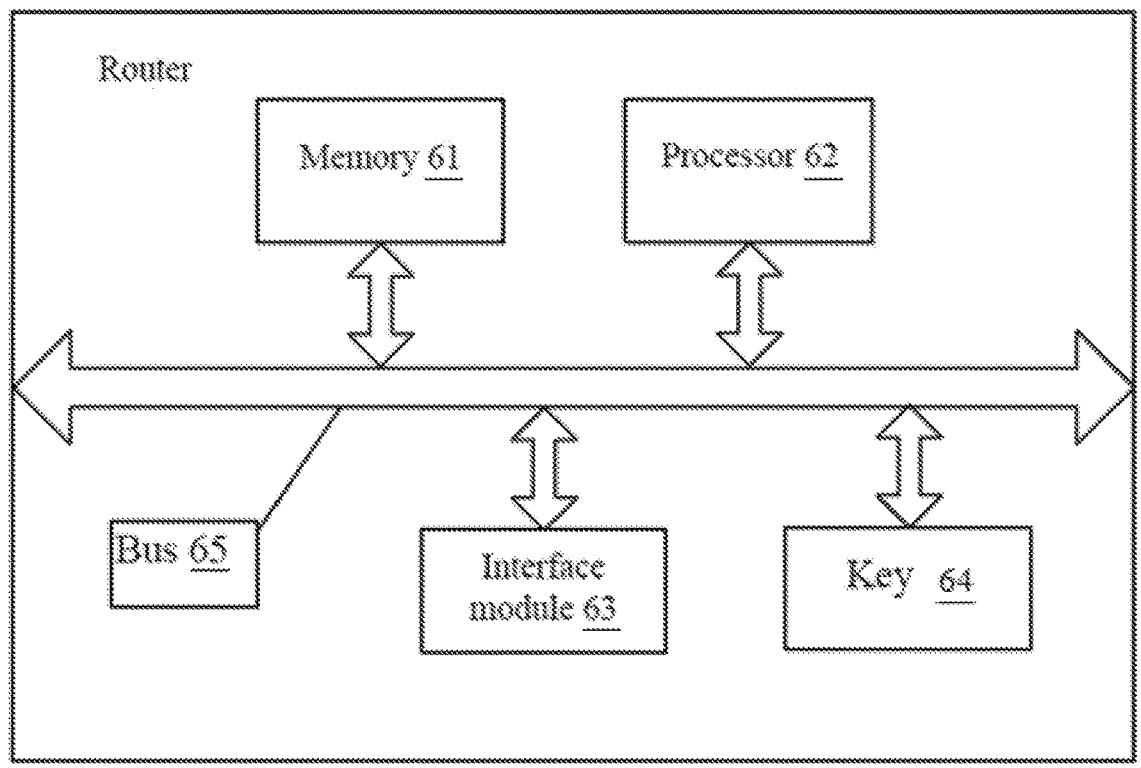
FIG. 6 is a schematic structural diagram of a router according to another embodiment of the disclosure.

Embodiments of the disclosure further provide a router. With reference to FIG. 6, the router includes a memory 61 storing computer programs and a processor 62. The memory 61 is configured to store software programs and modules. By executing the software programs and modules stored on the memory 61, the processor 62 is configured to perform various function application and data processing. Specifically, by executing the computer programs stored on the memory 61, the processor 62 performs the following steps:

Receiving a trigger instruction triggered by a key arranged on the router;

enabling a hidden wireless communication function of the router in response to the trigger instruction, wherein the hidden wireless communication function is associated with a first hidden SSID; and transmitting network connection information to the smart device to trigger connection of the smart device to a network connected to the router based on the network connection information, if it is detected within a preset period of time that the smart device connects to a communication link corresponding to the hidden wireless communication function, wherein the network connection information comprises a second SSID and a password of the router.

Assuming that the above is a first exemplary implementation, then in a second exemplary implementation provided based on the first exemplary implementation, before the step of transmitting network connection information to the smart device, the following steps are further included:

receiving gateway discovery information transmitted by the smart device;

transmitting gateway discovery response information to the smart device in response to the gateway discovery information; and receiving and responding to network connection request information transmitted by the smart device.

In a third exemplary implementation provided based on the first exemplary implementation or the second exemplary implementation, after the step of transmitting network connection information to the smart device, the following step is further included:

when the network connection information of the router changes, transmitting updated network connection information to the smart device.

In a fourth exemplary implementation provided based on the first exemplary implementation or the second exemplary implementation, after the step of enabling a hidden wireless communication function of the router, the following step is further included:

disabling the hidden wireless communication function of the router after the preset period of time elapses.

Optionally, as shown in FIG. 6, the router may further include one or more interface modules 63 (only one is shown in FIG. 6) and one or more keys 64 (only one is shown in FIG. 6). The memory 61, the processor 62, the interface module 63 and the key 64 are connected through a bus 65.

It is to be understood that in embodiments of the disclosure, the processor 62 may be a central processing unit (CPU), and the processor may also be any other general processor, a digital signal processors (DSP), an application specific integrated circuits (ASIC), a field programmable gate arrays (FPGA) or other programmable logic device, discrete gate or transistor logic, discrete hardware components and the like. A general-purpose processor can be a microprocessor, or alternatively the processor can be any conventional processor or the like.

The memory 61 can include read-only memory (ROM), flash memory and random access memory (RAM), and provide instructions and data to the processor 62. A portion or all of the memory 61 can also include non-volatile random access memory (NVRAM).

The interface module 63 may include an LAN interface, a WAN interface and a configuration interface. The LAN interface is mainly used for connection between the router and an LAN, and can include a cable interface, an Ethernet interface, a fiber optic interface and the like. The WAN interface is mainly used for connection between the router and a WAN, and can include an Ethernet and Fast Ethernet interface, a high-speed serial interface, a high-speed synchronous serial interface, an asynchronous serial interface, an Integrated Services Digital Network (ISDN) port and the like. The configuration interface is mainly used for configuring the router, and can include a controller port, an asynchronous port and the like.

The key 64 can be a virtual key or a physical key arranged on the router, or an application associated with the router, or any key for transmitting an instruction when being pressed by a user.

As can be seen from above, in the embodiment of the disclosure, when receiving the trigger instruction, the router enables its hidden wireless communication function to wait for connection of the smart device, transmits the second SSID and the password to the smart device establishing a preliminary connection within the preset period of time so that the smart device can, based on the second SSID and the password, connect to the network connected to the router, thereby achieving the purpose of fast completing automatic connection with the smart device within the preset period of time.

Seventh Embodiment

Figure 7:
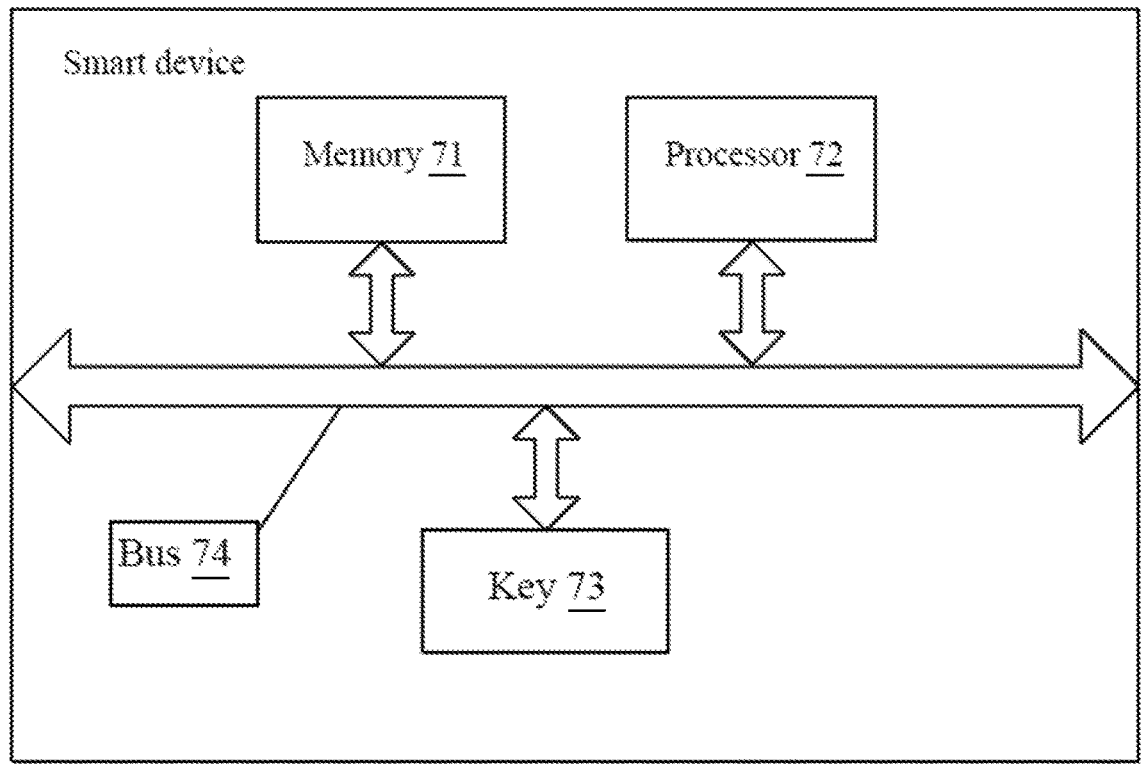
FIG. 7 is a schematic structural diagram of a smart device according to another embodiment of the disclosure.

Embodiments of the disclosure further provide a smart device. With reference to FIG. 7, the smart device includes a memory 71 storing computer programs and a processor 72. The memory 71 is configured to store software programs and modules. By executing the software programs and modules stored on the memory 71, the processor 72 is configured to perform various function application and data processing. Specifically, by executing the computer programs stored on the memory 71, the processor 72 performs the following steps:

receiving a trigger instruction triggered by a key arranged on the smart device;

performing communication connection based on a preset first SSID and a preset password in response to the trigger instruction; and connecting to a network connected to the router based on the network connection information, if the smart device successfully connects to a communication link corresponding to the first SSID within a preset period of time and receives network connection information transmitted by the router.

Assuming that the above is a first exemplary implementation, then in a second exemplary implementation provided based on the first exemplary implementation, after the step of successfully connecting to a communication link corresponding to the first SSID, the following steps are further included:

transmitting gateway discovery information to the router;

receiving gateway discovery response information transmitted by the router; and transmitting network connection request information according to the received gateway discovery response information to trigger transmission of the network connection information by the router.

In a third exemplary implementation provided based on the first exemplary implementation or the second exemplary implementation, after the step of connecting to a network connected to the router based on the network connection information, the following step is further included:

upon reception of new network connection information transmitted by the router, connecting to the network connected to the router based on the new network connection information.

In a fourth exemplary implementation provided based on the first exemplary implementation or the second exemplary implementation, the method further includes: if the smart device fails to successfully connect to a communication link corresponding to the preset first SSID within the preset period of time, outputting prompt information.

Herein, the smart device may be a smart device that has a network connection function and needs to establish a connection with the router to perform network communication through the router, such as a smart remote controller and a luminaire.

Optionally, as shown in FIG. 7, the smart device may further include one or more keys 73 (only one is shown in FIG. 7). The memory 71, the processor 72 and the key 73 are connected through a bus 74.

It is to be understood that in embodiments of the disclosure, the processor 72 may be a central processing unit (CPU), and the processor may also be any other general-purpose processor, a digital signal processors (DSP), an application specific integrated circuits (ASIC), a field programmable gate arrays (FPGA) or other programmable logic device, discrete gate or transistor logic, discrete hardware components and the like. A general-purpose processor can be a microprocessor, or alternatively the processor can be any conventional processor or the like.

The memory 71 can include read-only memory (ROM), flash memory and random access memory (RAM), and provide instructions and data to the processor 72. A portion or all of the memory 71 can also include non-volatile random access memory (NVRAM).

The key 73 can be a virtual key or a physical key arranged on the smart device, or an application associated with the router, or any key for transmitting an instruction when being pressed by a user.

It is to be understood that besides what is shown in FIG. 7, the smart device may further include modules and means required to implement corresponding functions of a different device. For example, the smart luminaire may further include a lighting device for implementing the lighting function and modules and means required when data transmission is performed (for example, a required wireless communication module is included when data transmission with the router is performed).

In the embodiment of the disclosure, after receiving and responding to the trigger instruction, the smart device performs communication connection with the router according to the first SSID and the password that are set in advance. If the smart device successfully connects to a communication link corresponding to the first SSID within a preset period of time, the smart device receives the second SSID and the password transmitted by the router, and the smart device connects to a network connected to the router based on the second SSID and the password, thereby achieving automatic connection with the router.

When the integrated modules or units in the above embodiments are implemented in the form of software functional units and then sold or used as an independent product, they can be stored in a computer readable storage medium. Based on the above, the whole or parts of the process of the method in the above embodiments can also be implemented by computer program that can instruct related hardware. The computer program can be stored in a computer-readable storage medium. When the computer program is executed by a processor, the steps of the above various method embodiments can be performed. Herein, the computer program includes computer program codes that can be in the form of source codes, object codes, executable files or some intermediate thereof. The computer readable medium may include any entity or device that can carry the above computer program codes, including a recording medium such as a USB flash disk, a mobile hard disk, a magnetic disk, or an optic disk; a computer memory such as a read-only memory (ROM), a random access memory (ROM); an electronic carrier signal; a telecommunication signal; a software distribution medium and the like. It is to be noted that the content included in the above readable medium can be added or reduced as appropriate according to legislation in a judicial district or requirements on patent practices.

The above description of the disclosed embodiments enables any person skilled in the art to make or use the present invention. Various modifications to these embodiments will be readily apparent to those skilled in the art, and the generic principles described herein can be applied to other implementations without departing from the spirit or scope of the invention. Thus, the present invention will not be limited to these embodiments shown in this application, but shall accord with the widest scope consistent with the principles and novel characteristics disclosed by this application.

It is clear to those skilled in the art that for convenience of description and concision of illumination, the functional division of the various functional units and modules is for illustration only. In practical applications, the above functions can be assigned to and implemented by different functional units or modules. In other words, the above device is divided into different functional units or modules to implement all or part of the functions described above. Respective function units and modules in respective embodiments of the disclosure can be integrated into one processing unit or can be independent units, and two or more units can be integrated into one unit. Integrated units can be implemented not only by hardware but also by software function unit. In addition, specific names of the function units and modules are only used to distinguish one another, and are not intended to limit the scope of the invention. For specific operation processes of the units or modules in the system, please refer to corresponding processes in the method embodiments, and no further description is believed necessary.

It is to be noted that the methods and its details provided by the above embodiments can be combined to the devices and apparatuses provided by the embodiments, and no further description is believed necessary.

Those skilled in the art can understand that, the units and algorithm steps in the various examples described in connection with the embodiments disclosed herein, can be realized by electronic hardware, computer software, or a combination of both. Whether these functions are implemented in hardware or software depends on particular applications and design constraints of respective solutions. Those skilled in the art can use different methods for each specific application to achieve the described functions, but such implements should not be considered beyond the scope of the invention.

In the embodiments provided by the disclosure, it should be appreciated that the disclosed device/terminal device and method can be implemented by other approaches. The device embodiments described above are for illustration only. For example, the division of units is only a division of logic functions and can be divided in other ways during practical implementation. For example, multiple units or components can be combined or integrated into another system, or some features can be omitted or not implemented.

The above embodiments are only used to explain the technical schemes of the present invention and shall not be construed as limiting. Although the present invention has been described with reference to the aforementioned embodiments, ordinary people skilled in the art should understand that modifications or equivalent substitutions of some technical feature can be made on the technical schemes of the present invention without departing from the spirit scope of the technical schemes of the present invention, all of which should be contained within the scope of the protection of the present invention.

The invention claimed is:

1. A method for automatic connection between a smart device and a router, applied to the router, the method comprising:
   receiving a trigger instruction triggered by a first physical key arranged on the router;
   in response to the trigger instruction, enabling a hidden wireless communication function of the router, wherein the hidden wireless communication function is associated with a first hidden SSID; and
   if it is detected within a preset period of time that the smart device connects to a communication link corresponding to the hidden wireless communication function, transmitting network connection information to the smart device to trigger connection of the smart device to a network connected to the router based on the network connection information, wherein the network connection information comprises a second SSID and a password of the router, and the connecting between the smart device and the communication link is triggered by a second physical key arranged on the smart device; and
   wherein
   the second physical key is triggered during the preset period of time that begins from when the first physical key is triggered to prevent misconnection.

2. The method according to claim 1, further comprising: before the step of transmitting network connection information to the smart device,
   receiving gateway discovery information transmitted by the smart device;
   in response to the gateway discovery information, transmitting gateway discovery response information to the smart device; and
   receiving and responding to network connection request information transmitted by the smart device.

3. The method according to claim 1, further comprising: after the step of transmitting network connection information to the smart device,
   when the network connection information of the router changes, transmitting updated network connection information to the smart device.

4. The method according to claim 2, further comprising: after the step of transmitting network connection information to the smart device,
   when the network connection information of the router changes, transmitting updated network connection information to the smart device.

5. The method according to claim 1, further comprising: after the step of enabling a hidden wireless communication function of the router,
   disabling the hidden wireless communication function of the router after the preset period of time elapses.

6. The method according to claim 2, further comprising: after the step of enabling a hidden wireless communication function of the router,
   disabling the hidden wireless communication function of the router after the preset period of time elapses.

7. A method for automatic connection between a smart device and a router, applied to the smart device, the method comprising:
   receiving a trigger instruction triggered by a first physical key arranged on the smart device;
   in response to the trigger instruction, performing communication connection based on a preset first SSID and a preset password; and
   if the smart device successfully connects to a communication link corresponding to the preset first SSID within a preset period of time and receives network connection information transmitted by the router, connecting to a network connected to the router based on the network connection information, wherein the network connection information comprises a second SSID and a password of the router and a hidden wireless communication function of the router that is associated with the preset first hidden SSID is enabled in the preset period of time after trigged by a second physical key arranged on the router; and wherein
the second physical key is triggered during the preset period of time that begins from when the first physical key is triggered to prevent misconnection.

8. The method according to claim 7, further comprising: after the smart device successfully connects to the communication link corresponding to the preset first SSID,
transmitting gateway discovery information to the router;
receiving gateway discovery response information transmitted by the router; and
transmitting network connection request information according to the received gateway discovery response information to trigger transmission of the network connection information by the router.

9. The method according to claim 7, further comprising: after the step of connecting to a network connected to the router based on the network connection information,
upon reception of new network connection information transmitted by the router, connecting to the network connected to the router based on the new network connection information.

10. The method according to claim 8, further comprising: after the step of connecting to a network connected to the router based on the network connection information,
upon reception of new network connection information transmitted by the router, connecting to the network connected to the router based on the new network connection information.

11. The method according to claim 7, further comprising: if the smart device fails to successfully connect to a communication link corresponding to the preset first SSID within the preset period of time, outputting prompt information.

12. The method according to claim 8, further comprising: if the smart device fails to successfully connect to a communication link corresponding to the preset first SSID within the preset period of time, outputting prompt information.

13. A router comprising: a memory storing computer programs, and a processor, wherein when the computer programs are executed by the processor, the processor is caused to perform steps of the method according to claim 1.

14. A smart device comprising: a memory storing computer programs, and a processor, wherein when the computer programs are executed by the processor, the processor is caused to perform steps of the method according to claim 7.

* * * * *